Aug. 11, 1964  R. POLK, JR  3,144,064
FRUIT HOLDER FOR SECTIONIZER
Filed March 9, 1961  3 Sheets-Sheet 1
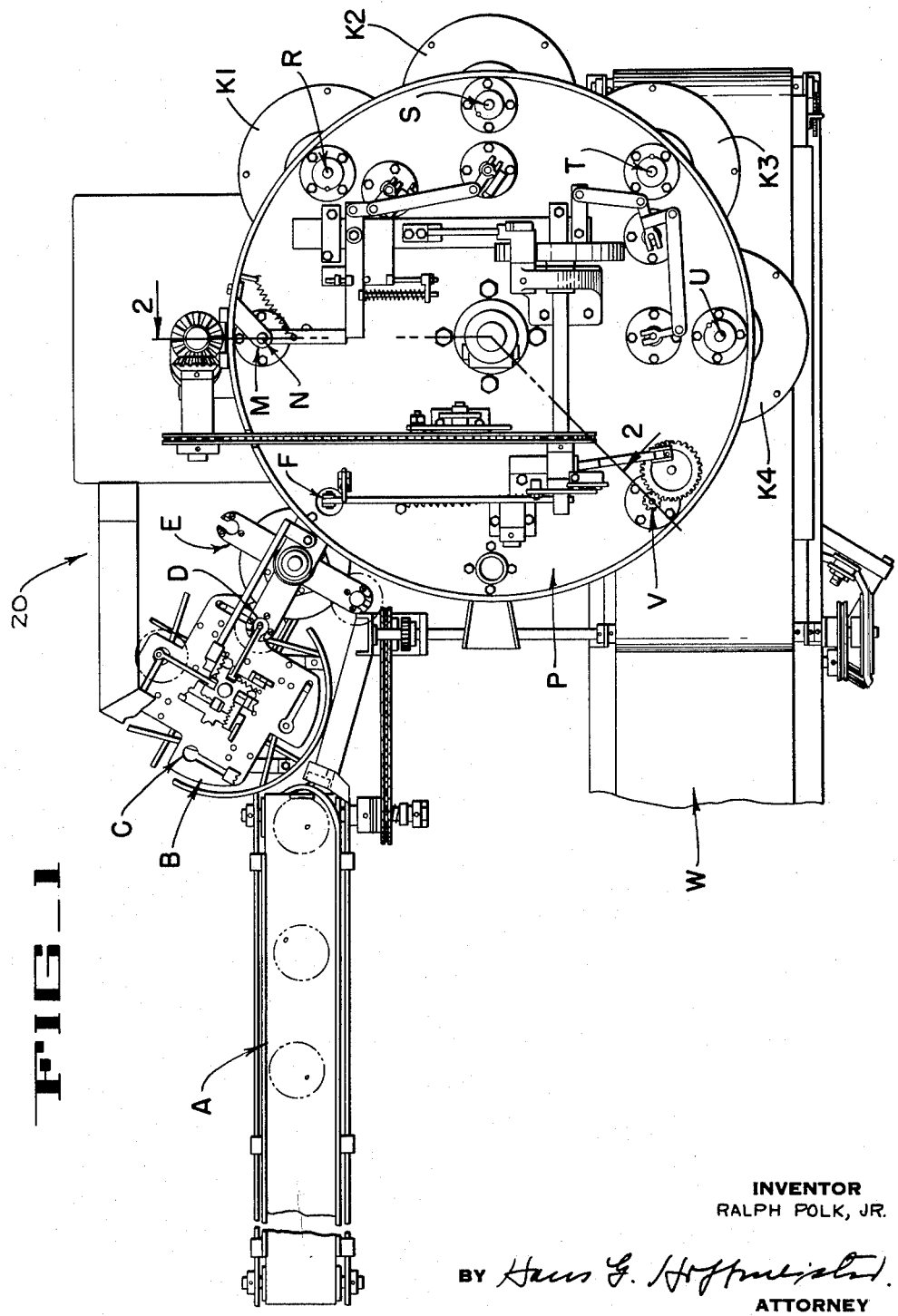
FIG_1
INVENTOR
RALPH POLK, JR.
BY Hans G. Hoffmeister
ATTORNEY

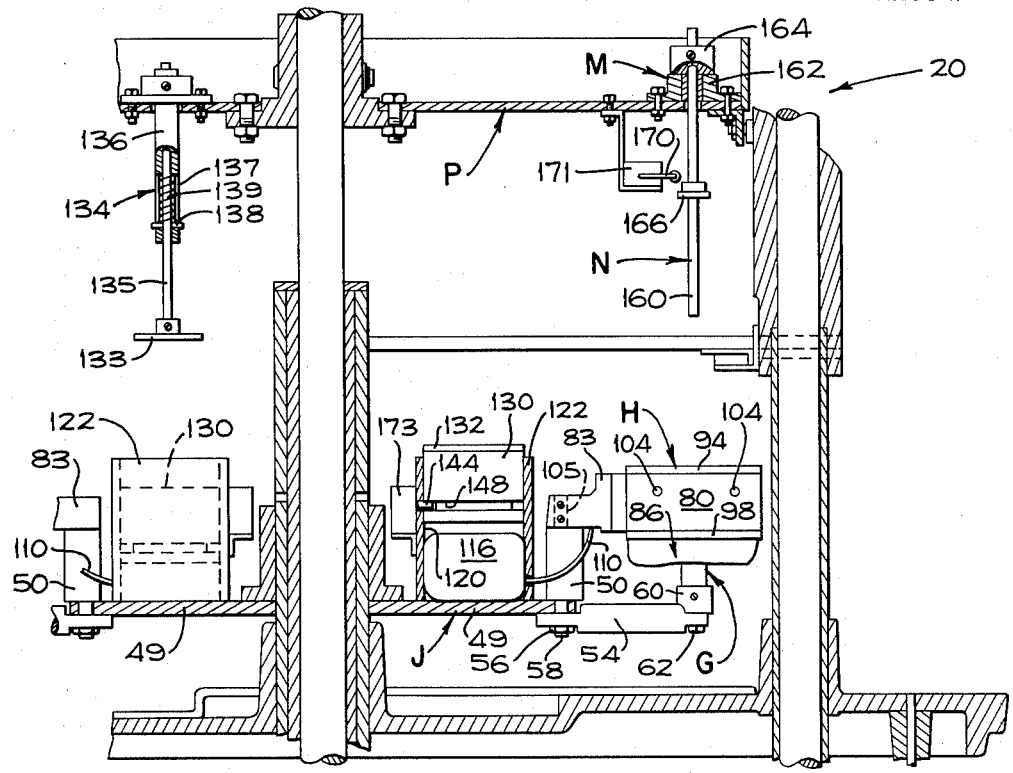
FIG_2
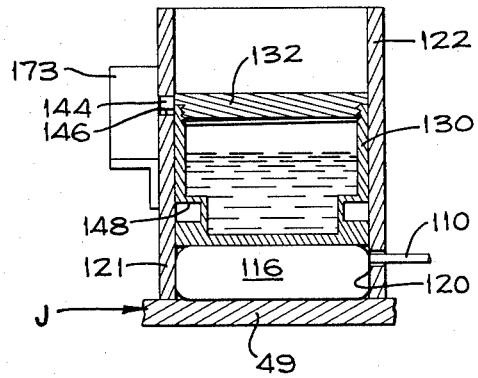
FIG_3
INVENTOR
RALPH POLK, JR.
BY *Hans G. Hoffmeister*
ATTORNEY Aug. 11, 1964 R. POLK, JR 3,144,064
FRUIT HOLDER FOR SECTIONIZER
Filed March 9, 1961 3 Sheets-Sheet 3
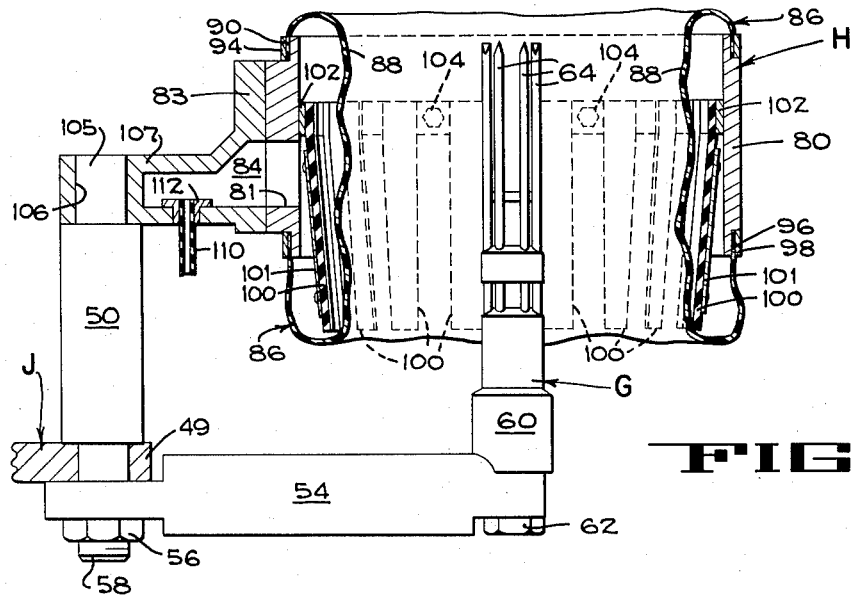
FIG_4
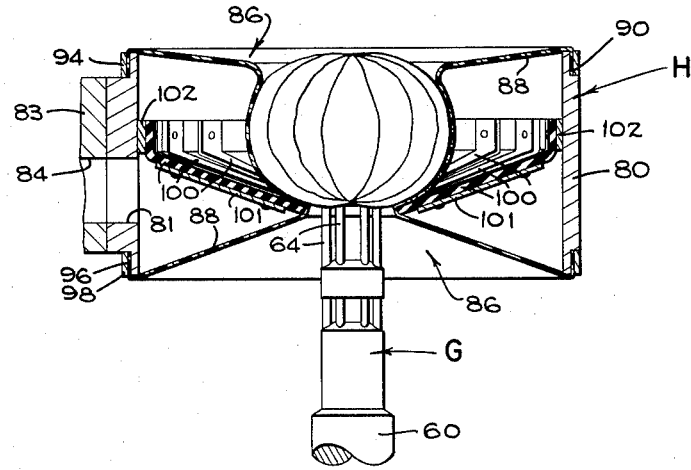
FIG_5
INVENTOR
RALPH POLK, JR.
BY *Hans G. Hoffmeister*
ATTORNEY United States Patent Office 3,144,064
Patented Aug. 11, 1964

3,144,064
FRUIT HOLDER FOR SECTIONIZER
Ralph Polk, Jr., Box 3208, Tampa, Fla.
Filed Mar. 9, 1961, Ser. No. 109,800
9 Claims. (Cl. 146—216)

This invention pertains to fruit preparation machines, and more particularly relates to apparatus for holding fruit in fixed position while it is subjected to the action of processing devices in a fruit processing machine.

In the processing of certain types of fruit, such as citrus fruit, blades or probes are moved through the fruit from top to bottom to loosen seeds or to separate meat segments of the fruit from the membranes to which they are naturally bonded. Fruit carriers have been developed in which a generally cylindrical inflatable fruit gripping member is mounted in a rigid cylindrical holder so that, when the member is inflated, its inner surface will move inwardly to grip the side peripheral surface of a fruit disposed within the cylindrical gripper. This type of pneumatic fruit holder has not been entirely successful since it has a tendency, while being inflated, to move upwardly between the sides of the fruit and the side of the rigid holder without gripping the fruit. Also in some instances when the lower end of the cylindrical gripper is disposed under the fruit in the holder, the tendency of this lower end to move upwardly during inflation has resulted in the fruit being lifted out of the fruit holder. Another limitation of these pneumatic grippers has been their inability to grip each fruit, regardless of size, with a constant pressure.

It is therefore an object of the present invention to provide an improved fruit gripper.

Another object is to provide a device for holding down the lower end of a cylindrical pneumatic fruit gripper while it is being inflated.

Another object is to provide a pneumatic fruit gripper capable of exerting a constant pressure on each fruit regardless of the size of the fruit.

Another object is to provide a pneumatic fruit gripper that is capable of maintaining contact with the surface of the fruit even when blades moving out of the fruit tend to move the gripper away from the fruit.

Other and further objects and advantages of the present invention will become apparent from the following description taken in connection with the accompanying drawings in which:

FIG. 1 is a more or less diagrammatic plan view of the machine of the present invention.

FIG. 2 is an enlarged fragmentary diagrammatic vertical section taken along line 2—2 of FIG. 1.

FIG. 3 is a diagrammatic vertical section showing a portion of the mechanism of FIG. 2 at an enlarged scale and in a different operating position.

FIG. 4 is an enlarged diagrammatic vertical section taken through the fruit gripper of FIG. 2.

FIG. 5 is a vertical section similar to FIG. 4 but illustrating the pneumatic fruit gripper in inflated condition.

Although the fruit holder of the present invention is useful generally for holding fruit in any machine wherein the fruit must be held in fixed position while it is being acted on by processing tools, it is particularly adapted for use in a citrus fruit sectionizing machine of the type disclosed in my copending application Serial No. 730,298, filed April 23, 1958, now Patent No. 3,030,990. The machine 20 (FIG. 1) of the present invention is substantially identical to that disclosed in the above-identified application except that the improved fruit holder and associated mechanisms of the present invention have been substituted in the machine 20 for the band-type fruit holder, used in the machine of said application, and its actuating mechanism. Accordingly, reference may be had to the above-identified application for a complete description of any mechanisms of the present machine not fully described hereinafter.

In general, the grapefruit sectionizing machine 20 comprises a supply conveyor A on which peeled and treated grapefruit are advanced to a position within reach of an operator who stands in front of a feed turret B and places each grapefruit on the feed turret at station C of the turret. The feed turret B is intermittently moved through 90° angular increments in a clockwise direction to bring each grapefruit to a transfer station D where the grapefruit is automatically transferred from the feed turret to a transfer turret E which is also arranged to be intermittently moved in 90° increments in synchronism with the movements of feed turret B, but in a counterclockwise direction. The grapefruit is then moved to a second transfer station F where it is deposited in one of a plurality of fruit carrier prong units G (FIGS. 2 and 4) around each of which is disposed one of the improved fruit holders H of the present invention.

The fruit carriers G are mounted on a main turret J which is arranged to be intermittently moved through 45° angular increments in a clockwise direction (FIG. 1) to move a grapefruit, held by a prong unit G and a holder H, successively to station M where a fruit detector unit N is mounted and then to stations R, S, T, U at each of which one of four sectionizing heads K1–K4 respectively is disposed. The heads are carried by and project downwardly from a vertically movable tool carrier or top plate P. As disclosed in my above-mentioned copending application, each head has a plurality of vertical blades arranged to be moved down into a grapefruit to separate the pie-shaped meat segments from the grapefruit core and from the radial membranes. The sectionized grapefruit, with the separated segments disposed around the core, is then brought under a rotary spinner or stripper unit V that wraps the radial membranes around the stationary core, causing any remaining bond between the membranes and the segments to be completely broken and causing the segments to drop onto a discharge conveyor W. The core is then moved to a position under a core stripping mechanism Y which removes the core from the machine.

The construction and operation of the mechanisms including the supply conveyor A, the feed turret B, the transfer turret E, the main turret J, the discharge conveyor Y, and the drive mechanisms for the conveyors and turrets are substantially identical to those disclosed in my above-mentioned copending application and, accordingly, their description will not be repeated here.

The present invention is particularly concerned with the eight fruit holders H (FIG. 2) (one only being shown) which are mounted at 45 degree angular intervals around the main turret J. The turret includes a circular turret plate 49 which has an upstanding post 50 mounted at the periphery of the plate adjacent each holder H. Directly below each post 50 is a support arm 54 which extends radially outwardly from the under surface of the plate 49. Each post 50 and its associated support arm 54 are held in fixed position by a nut 56 that is threaded on a stud 58 projecting downwardly from the post 50 through suitable openings in the plate 49 and in the support arm 54. One of the above-mentioned fruit carrier prong units G is mounted on the outer end of each arm 54, said unit comprising an upstanding prong holder 60, which is secured by a capscrew 62 to the outer end of the support arm 54, and a circular formation of prongs 64 fixed in and project upwardly from the prong holder 60.

One of the improved fruit clamping and holding units H of the present invention is associated with each fruit carrier. Each holder H comprises a rigid cylindrical metal support ring 80 (FIG. 4) having an air inlet opening 81 in its side wall. An adapter bracket 83, which is secured to the ring 80, has a passage 84 communicating with the air inlet opening 81 of the ring.

An inflatable fruit gripping element 86 is provided in the ring by a tubular sheet 88 of thin material. The material must be resistant to citric acid and must be capable of retaining air under pressure. Further, it should be flexible and pliable. A material that has been found to be satisfactory for this service is a nylon cloth impregnated with a synthetic rubber such as Nitrile. The upper annular end of the tubular member 88 is disposed over the upper edge of the metal ring 80 and is secured in a recess 90 by a flexible metal band 94 which has the usual clamping means (not shown) for tightening such bands. The lower annular end of the tubular element is secured in a recess 96 in the ring 80 by a metal band 98 which is also provided with means for tightening the band. If desired, fibre bands may be positioned between the sheet metal bands and the gripping element.

When the gripper 86 is in its deflated condition, it assumes a position similar to that shown in FIG. 4. When it is inflated, it is moved to the position of FIG. 5. In the inflated condition, the lower end of the element 88 is prevented from moving upwardly by a plurality of fingers 100 that are riveted to a metal band 102 which, in turn, is secured by capscrews 104 to the inner cylindrical surface of the ring 80. The fingers 100, which are disposed in spaced relation around the entire inner surface of the ring 80, are made of a flexible material such as hard rubber or neoprene so that they are capable of flexing or pivoting near their upper ends to permit the lower ends to move toward the fruit as the gripper element is inflated. In order to make the intermediate portion of each finger relatively stiff, an aluminum strap 101 is riveted to the back side of the finger. These fingers could be made with the metal stiffener molded in the fingers. Also, it is within the concept of this invention to make the fingers of relatively stiff material and connect them to the inner surface of the ring 80 by a hinged or pivoted joint. In effect, the fingers form abutment members which are contacted by and prevent upward movement of the gripper but permit inward swinging movement of the lower end of the gripper.

It is to be particularly noted that the circumference of the tubular element 86 is considerably larger than the surface area of the largest fruit to be processed. Accordingly, when the element is inflated, its inner surface is not stretched to a flattened condition. Rather, numerous overlapping folds of the element are formed in abutting contact with the surface of the fruit. Therefore, when sectionizing blades pass out of the fruit during the sectionizing operation, they do not meet a taut surface which they might cut into but are received in the folds of the yieldable element. The yielding element, of course, does not swing away from the fruit but yields only enough to permit the blade to become enclosed therein; the gripping contact of the remainder of the element is not disturbed.

The fruit holder is mounted in fixed position on the turret by means of a rod 105 (FIGS. 2 and 4) which is formed on and projects upwardly from the adjacent mounting post 50. The rod 105 is secured in a suitable opening 106 (FIG. 4) in an extended portion 107 of the adaptor bracket 83.

Air is supplied to the inflatable element 86 by means of a flexible conduit 110 which communicates at one end with the air passage 84 of the adapter bracket 83. The conduit may be secured to the bracket 83 in any suitable manner as by a nipple 112 (FIG. 4) in which the flexible conduit is glued and which, in turn, is glued to the bracket. At its other end, the flexible conduit 110 is secured in a contractible air reservoir such as a bladder 116 that may be made of the same material as the inflatable gripper and is confined in a chamber 120 defined by the lower wall portion 121 of a rigid cylinder 122 that is secured in any suitable manner, as by bolts, to the upper surface of the turret plate 49. It will be understood that there is one air reservoir 116 for each inflatable gripping element 86.

A piston in the form of a hollow cylindrical metal container 130 is slidably disposed in the upper portion of the cylinder 122. At its upper end, the hollow container 130 is internally threaded to receive a metal cover 132. To provide the slidable container 130 with sufficient weight to compress the bladder 116, a liquid such as water is deposited in the container when the cover 132 is removed. It will be understood that when the weighted container 130 is allowed to slide downwardly in the cylinder 122, the bladder will be squeezed down, as seen in FIG. 3, and air will be forced over to the inflatable fruit gripper 86 to inflate this gripper and move its inner wall into gripping engagement with the fruit.

Referring again to FIG. 1 it will be seen that, when the fruit holder reaches a position beneath the stripper Y, the segments of the fruit have been separated from their enclosing membranes and are ready to be discharged. Accordingly, at this station it is desirable that the grip of the inflatable element be relaxed. For this purpose, a permanent magnet 133 (FIG. 2) is suitably mounted by means of a support member 134 on the vertically movable tool carrier P directly above the position the container 130 assumes at the stripper station. The support member 134 includes a rod 135 that is slidable in a fixed tube 136. The tube 136 has a longitudinal slot 137 which receives a pin 138 carried by the rod 135. A spring 139, disposed around the rod and between the pin 138 and the upper wall of the slot, urges the rod 135 downwardly. With this arrangement the magnet is permitted to make a firm contact with the top of the container and the length of the linkage is adjusted automatically to adapt the linkage to any position of the container.

When the tool carrier plate P is lowered, the magnet 133 comes in contact with and grips the metal cover 132 of container 130. Then, upon the next upward movement of the carrier P, the weighted container is elevated. As the container is elevated, a spring-biased latch 144 (FIG. 3), which is slidably journalled in an opening 146 in the upper wall of the cylinder 122, bears against the side wall of the upwardly moving container. When an annular recess 148 in the surface of the container reaches a point opposite the latch, the latch automatically moves into the recess to prevent further upward movement of the container and to hold the container against downward movement. Further upward movement of the carrier plate P will, of course, break the grip of the magnet on the container.

The weighted container remains in its upper latched position until it again reaches the fruit detector station M. The fruit detector unit N at this station comprises a rod 160 (FIG. 2) which is slidably disposed in a bushing 162 carried by the plate P and has a weighted collar 164 setscrewed to its upper end to cause it to assume the normal, downwardly projecting position of FIG. 2. A switch actuator collar 166 is secured to the rod 160 intermediate the ends of the rod. If there is a grapefruit in the pneumatic holder when the plate P is lowered, the lower end of the rod will engage the fruit and the downward movement of the rod 160 will be arrested although the plate P continues downwardly. Under such conditions an actuator arm 170 of a switch 171, that is carried by the plate P, will engage the collar 166 and be actuated thereby. When the arm 170 is actuated, a contact of switch 171 is closed causing current to be directed to a solenoid 173 to energize the solenoid and cause the latch 144, which is a part of or connected to the solenoid, to be withdrawn from the annular recess in the weighted container. Accordingly, if there is a fruit in the fruit holder when the holder reaches the fruit detecting station M, the weighted container will be released and, as it moves downwardly, it will squeeze the bladder 116 causing the fruit gripper 86 to be inflated into gripping engagement with the fruit.

It will be understood that the switch actuator arm 170 is of the type that will actuate the switch only when the collar 166 hits the bottom of arm 170. Therefore, when the carrier plate P is raised upwardly, permitting the rod 160 to drop, the actuator arm 170 will freely pivot, to allow the collar 166 to pass, without actuating the switch. Also, it will be understood that the control circuit of the solenoid 173 is such that the solenoid will be energized only long enough to permit the annular recess of the weighted container to drop below the latch 144. As soon as this has happened, the solenoid is de-energized, permitting the spring-loaded latch to move into surface contact with the container, ready to move into the annular recess if the container is elevated.

From the foregoing description, it will be evident that the fingers 109 of the fruit holder provide a simple, effective means of preventing the inflatable element from moving upwardly out of the rigid frame while it is being inflated. Also the container 130, the weight of which may be readily changed by adding or removing liquid therefrom, makes possible the gripping of each fruit, regardless of size, with a substantially constant pressure.

It will be understood that modifications and variations may be effected without departing from the scope of the present invention as defined by the claims appended hereto.

Having thus described my invention, what I claim as new and desire to protect by Letters Patent is:

1. In a fruit processing machine, a fruit support member, a rigid ring adapted to encircle a fruit on said support member, an annular inflatable fruit gripper mounted within said ring and disposed close against the inner surface of the ring when said gripper is deflated, and means for directing air under constant pressure to said gripper to inflate said gripper and move its inner surface into contact with the fruit on said fruit support, said air directing means including a contractible air reservoir, conduit means connecting the interior of said reservoir to the interior of said gripper, and an adjustable weighted member freely movable into engagement with said reservoir to contract it and force air into said gripper to expand it into contact with the fruit.

2. In a fruit processing machine, a fruit support member, a rigid ring adapted to encircle a fruit on said support member, an annular inflatable fruit gripper mounted within said ring, a collapsible air reservoir, means establishing flow communication between the interior of said reservoir and the interior of said gripper, a guide member having side wall portions encircling said reservoir, a weighted pressure member freely movable downwardly in said guide member to engage and collapse said reservoir to force air from said reservoir to said gripper to inflate said gripper and move it into gripping engagement with the fruit on said support member.

3. In a fruit processing machine, a fruit carrier, a rigid support ring disposed around a fruit on said carrier, an inflatable annular fruit gripper of thin pliable material mounted in said ring, and means for directing air into said annular fruit gripper to inflate said gripper and move its inner peripheral surface into contact with a fruit on said carrier, said inner peripheral surface of said gripper being larger than the peripheral surface of the fruit in contact therewith whereby folds of said pliable material are held in gripping contact with the surface of the fruit.

4. In a fruit processing machine, a fruit carrier, a rigid support cylinder encircling a fruit on said carrier and having an inlet opening in its wall, a tubular member of thin air-impervious pliable material disposed in said cylinder with one end secured in air tight engagement with one rim of said cylinder and the other end secured to the other rim of said cylinder to define an air chamber in communication with the air inlet opening of said cylinder, said tubular member being adapted to hang loosely in said cylinder close to the interior wall thereof when in deflated condition, and means for directing air through said inlet opening into said air chamber to inflate said tubular member and move the inner wall into engagement with a fruit supported on said carrier, the inner peripheral area of said tubular member being larger than the peripheral area of the largest fruit to be processed whereby folds of said thin pliable material are formed and pressed against the fruit.

5. In a fruit processing machine, a rigid cylinder having an air inlet opening in its wall, an inflatable fruit gripping member mounted in said cylinder to hang loosely down along the inner surface of said cylinder when in deflated condition, said inflatable member having an air chamber in communication with said air inlet opening, and abutment means secured to said cylinder and projecting downwardly in said air chamber to a point adjacent the lower end thereof, said abutment means being positioned to intercept the lower end of said gripping member as it moves upwardly during inflation of said member.

6. In a fruit processing machine, a rigid support cylinder having an inlet opening in its wall, a tubular member of thin air-impervious pliable material disposed in said cylinder with one end secured in air tight engagement with one rim of said cylinder and the other end secured to the other rim of said cylinder to define an air chamber in communication with the air inlet opening of said cylinder, said tubular member being adapted to hang loosely in said cylinder close to the interior wall thereof when in deflated condition, and abutment means secured to the inner surface of the wall of said cylinder and extending downwardly within said air chamber to a point adjacent the lower end of the tubular member, said abutment means being positioned to intercept and prevent upward movement of said lower end.

7. In a fruit processing machine, a rigid support cylinder having an inlet opening in its wall, a tubular member of thin air-impervious pliable material disposed in said cylinder with one end secured in air tight engagement with one rim of said cylinder and the other end secured to the other rim of said cylinder to define an air chamber in communication with the air inlet opening of said cylinder, said tubular member being adapted to hang loosely in said cylinder close to the interior wall thereof when in deflated condition, and a plurality of pivotal abutment fingers, secured to the inner surface of said cylinder and extending downwardly in said air chamber to a point adjacent the lower end of said tubular member when said member is deflated, said fingers being positioned to intercept and prevent upward movement of the lower end of said member during introduction of air into said air chamber.

8. In a fruit processing machine, a rigid support cylinder having an inlet opening in its wall, a tubular member of thin air-impervious pliable material disposed in said cylinder with one end secured in air tight engagement with one rim of said cylinder and the other end secured to the other rim of said cylinder to define an air chamber in communication with the air inlet opening of said cylinder, said tubular member being adapted to hang loosely in said cylinder close to the interior wall thereof when in deflated condition, means for directing air into said air chamber to expand said tubular member, a mounting ring secured to the inner surface of said cylinder, and a plurality of spaced abutment fingers mounted on said ring and projecting downwardly in said air chamber to a point adjacent the lower end of said tubular member when said member is deflated, said fingers having a rigid central body portion and a bendable upper end portion which permits pivotal movement of said fingers during inflation of said tubular members.

9. In a fruit processing machine, a fruit carrier; a rigid cylinder having an air inlet opening in its wall; an inflatable fruit gripping member mounted in said cylinder to hang loosely down along the inner surface of said cylinder when in deflated condition, said inflatable member having an air chamber in communication with said air inlet opening; means for directing air under constant pressure to said gripper to inflate said gripper and move its inner surface into contact with the fruit on said fruit support, said air directing means including a collapsible air reservoir, conduit means connecting the interior of said reservoir to said air inlet opening, and an adjustable weighted member movable into engagement with said reservoir to contract it and force air into said gripper to expand it into contact with the fruit; and abutment means secured to said cylinder and projecting downwardly in said air chamber to a point adjacent the lower end thereof, said abutment means being positioned to intercept the lower end of said gripping member as it moves upwardly while air under constant pressure is being directed into said air chamber under constant pressure.

References Cited in the file of this patent
UNITED STATES PATENTS

| | | |
|---|---|---|
| 1,780,200 | Linderman | Nov. 4, 1930 |
| 2,534,527 | Myers | Dec. 19, 1950 |
| 2,627,884 | Polk | Feb. 10, 1953 |
| 2,629,227 | Wolfe | Feb. 24, 1953 |
| 2,756,883 | Schreck | July 31, 1956 |
| 2,880,774 | Perrelli | Apr. 7, 1959 |
| 2,901,013 | Freeman | Aug. 25, 1959 |
| 2,932,825 | Vaughan | Apr. 12, 1960 |